US010883918B2

(12) United States Patent
Yang et al.

(10) Patent No.: US 10,883,918 B2
(45) Date of Patent: Jan. 5, 2021

(54) MULTIELECTRODE PROBES FOR MONITORING FLUCTUATING STRAY CURRENT EFFECTS AND AC INTERFERENCE ON CORROSION OF BURIED PIPELINES AND METAL STRUCTURES

(71) Applicants: Xiaodong Sun Yang, Minden, NV (US); Lietai Yang Yang, Minden, NV (US)

(72) Inventors: Xiaodong Sun Yang, Minden, NV (US); Lietai Yang Yang, Minden, NV (US)

( * ) Notice: Subject to any disclaimer, the term of this patent is extended or adjusted under 35 U.S.C. 154(b) by 0 days.

(21) Appl. No.: 16/501,742

(22) Filed: May 31, 2019

(65) Prior Publication Data

US 2020/0378885 A1 Dec. 3, 2020

(51) Int. Cl.
*G01R 7/08* (2006.01)
*G01N 17/04* (2006.01)
*G01N 17/02* (2006.01)

(52) U.S. Cl.
CPC .............. *G01N 17/04* (2013.01); *G01N 17/02* (2013.01)

(58) Field of Classification Search
CPC ...... G01N 17/02; G01N 17/04; G01N 17/043; G01N 17/006
See application file for complete search history.

(56) References Cited

U.S. PATENT DOCUMENTS

| 4,188,826 A | * | 2/1980 | Kankura | G01F 23/24 73/304 R |
| 4,208,264 A | * | 6/1980 | Polak | C23F 13/04 204/404 |
| 5,445,719 A | * | 8/1995 | Boiko | C23F 13/00 204/404 |
| 6,132,593 A | | 10/2000 | Tan | |
| 6,683,463 B2 | | 1/2004 | Yang | |

(Continued)

OTHER PUBLICATIONS

Y. Du, et al, 'Research on Parameter Fluctuation Characteristics and Effects on Corrosion Rates under Dynamic DC Stray Current from Metro System', Corrosion/2019, paper No. 13203 (Houston, TX: NACE International, 2019).

(Continued)

*Primary Examiner* — Thang X Le

(57) ABSTRACT

As the development of DC transit systems continues, many of the buried pipelines and metal structures close to the metro system have experienced accelerated corrosion by the dynamic DC stray current. Because of the dynamic feature of the stray currents, monitoring the effect of the dynamic stray current on the corrosion of the buried structures has been a challenging task.
This invention discloses a method to use a multielectrode system to measure the effect of dynamic stray currents on the corrosion of a metal structure or buried pipeline. The method also measures the effectiveness of cathodic protection under the influence of stray current.
High-voltage power transmission lines that produce a changing magnetic field, which in turn produces an alternating current flowing through the berried pipe or other structures that run in parallel with the transmission lines. The method disclosed in this invention may also be used to detect the effect of the interference of the alternating current.

13 Claims, 7 Drawing Sheets

(56) References Cited

U.S. PATENT DOCUMENTS

| | | | |
|---|---|---|---|
| 6,987,396 B2 | 1/2006 | Yang | |
| 7,180,309 B1 | 2/2007 | Yang | |
| 7,285,203 B2 * | 10/2007 | Russell | C23F 13/04 |
| | | | 205/725 |
| 7,466,149 B1 | 12/2008 | Yang | |
| 7,675,297 B1 | 3/2010 | Yang | |
| 8,111,078 B1 * | 2/2012 | Yang | G01N 17/02 |
| | | | 204/404 |
| 2003/0169058 A1 * | 9/2003 | Pierre | C23F 13/04 |
| | | | 324/700 |
| 2015/0204775 A1 * | 7/2015 | Shukla | G01N 17/006 |
| | | | 702/57 |

OTHER PUBLICATIONS

X. Sun, "Corrosion monitoring under cathodic protection conditions using multielectrode array sensors," in "Corrosion Monitoring Techniques," L. Yang, ed., Woodhead Publishing, Success, UK (2008), pp. 614 to 637.

* cited by examiner

MULTIELECTRODE PROBES FOR MONITORING FLUCTUATING STRAY CURRENT EFFECTS AND AC INTERFERENCE ON CORROSION OF BURIED PIPELINES AND METAL STRUCTURES

TECHNICAL FIELD OF THE INVENTION

This invention relates to a multielectrode electrochemical system for monitoring the effect of stray current or the interference of alternating current on the corrosion of buried pipelines and metal structures

BACKGROUND OF THE INVENTION

As the development of more and more metro DC transit systems, many of the buried pipelines close to the metro systems have experienced accelerated corrosion by the dynamic DC stray current [see Yanxia Du, et al, 'Research on Parameter Fluctuation Characteristics and Effects on Corrosion Rates under Dynamic DC Stray Current from Metro System', CORROSION/2019, paper no. 13203 (Houston, Tex.: NACE International, 2019)]. For a metro DC transit system, with the moving of trains along metro line, both the position and the quantity of the stray current leaked from metro system change with time. So, the stray current activity on underground structures arising from metro system operation is not steady but dynamic in terms of current and potential amplitude. The stray current flowing into or out of the underground structures often reverses direction. Monitoring the effect of the dynamic stray current on the corrosion of the buried structures is important for mitigating the corrosion accelerated by the dynamic stray current.

Coupled multielectrode array sensors (CMAS) (see U.S. Pat. Nos. 6,683,463, 6,132,593, and 7,180,309) have been used for corrosion monitoring for cathodically protected systems [see X. Sun, "Corrosion monitoring under cathodic protection conditions using multielectrode array sensors," in "Corrosion Monitoring Techniques," L. Yang, ed., Woodhead Publishing, Success, UK (2008), Chapter 26, and pages 614 to 637]. However, the coupled multielectrode array sensor measures the DC effect. No one has tried an effective on-line and real-time method to measure the effect of dynamic stray current on the corrosion of buried metal structures because the dynamic currents often cycles like AC current which makes it very difficult to measure with a DC method.

This invention is related to a method to use a multielectrode probe to measure the effect of dynamic stray current on corrosion.

Similarly to the effect of dynamic stray current, the buried metal structures are also affected by the high-voltage power transition line that produce a changing magnetic field, which in turn produces an alternating current flowing through the buried pipe or other structures that run in parallel with the transmission lines. Such effect is often called AC interference. The method disclosed in this invention may also be used to detect the effect of the AC interference

SUMMARY

This invention is related to a method on how to use a multielectrode electrochemical sensor for monitoring the effect of stray current or the interference of alternating current on the corrosion of buried pipelines and metal structures.

Compared with the currently used coupon electrode probe which has only a single electrode, the multielectrode can measure the corrosion rate when the cathodic protection is insufficient, while the single-electrode probe cannot give the corrosion rate signal when there is not sufficient cathodic protection or when there is no stray currents. In addition, the multielectrode probe gives statistically more accurate corrosion rate that represents the worst-case corrosion on the metal structure because there are multiple electrodes coupled to the metal structure at the same time, while the single-electrode probe only gives one corrosion signal. If this single electrode's behavior deviates from the statistical average corrosion behavior of the metal, the corrosion signal from the single-electrode probe does not represent the worst-case corrosion.

Figure 1:
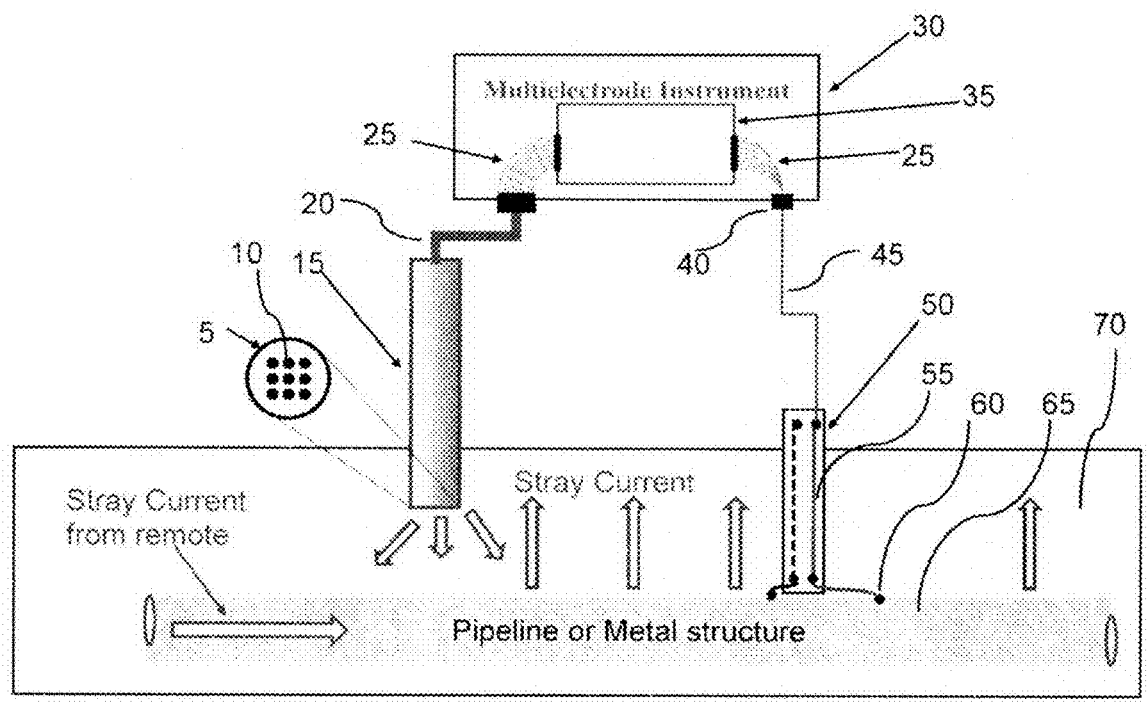
FIG. 1 illustrates the use of a multielectrode probe for monitoring corrosion of a buried pipe or other metal structure under the effect of stray currents.

REFERENCE NUMBERS OF DRAWINGS 5 sensing surface of multielectrode probe (15) viewed from the lower end of the probe
6 sensing surface of multielectrode probe (16) with a built-in reference electrode viewed from the lower end of the probe
10 individual electrodes on the sensing surface exposed to the corrosive electrolyte (soil for example)
11 tip of reference electrode in contact with the corrosive electrolyte (soil for example)
15 multielectrode probe (or coupled multielectrode array sensor probe)
16 multielectrode probe (or coupled multielectrode array sensor probe) with built-in reference electrode 18 reference electrode that is built into the multielectrode probe (16)
20 electrical cable of probe
25 electrical wires connecting each individual electrode to a current-measuring device (35)
30 multielectrode instrument
32 multielectrode instrument equipped with global positioning system (GPS)
35 multi-channel ammeter in the multielectrode instrument
40 coupling joint where all wires from individual electrodes are joined
45 wire connecting the coupling joint (40) to the buried pipe or immersed metal (65) under cathodic protection or under the influence of stray currents or AC interference
50 test station for buried pipe or metal structures where the access to the electrical cables (55) that are connected to the buried pipe or immersed metal structure (65) are available
55 electrical cable connected to the buried pipe or immersed metal structures (65)
60 point where the electrical cable (55) is electrically jointed to the buried pipe or metal structure (65)
65 buried pipe or immersed metal structure in contact with the corrosive electrolyte or soil (70).
70 electrolyte that causes corrosion (soil for example)
82 anode that is used for applying cathodic protection to the buried pipe or immersed metal structure
84 connector on multielectrode instrument for connection to reference electrode
85 alternating voltage source used for applying AC interference during the proof-of-concept experiment
90 DC power source used to apply the cathodic protection
95 counter electrode used for applying AC interference during the proof-of-concept experiment

DETAILED DESCRIPTIONS OF THE INVENTION

Figure 2:
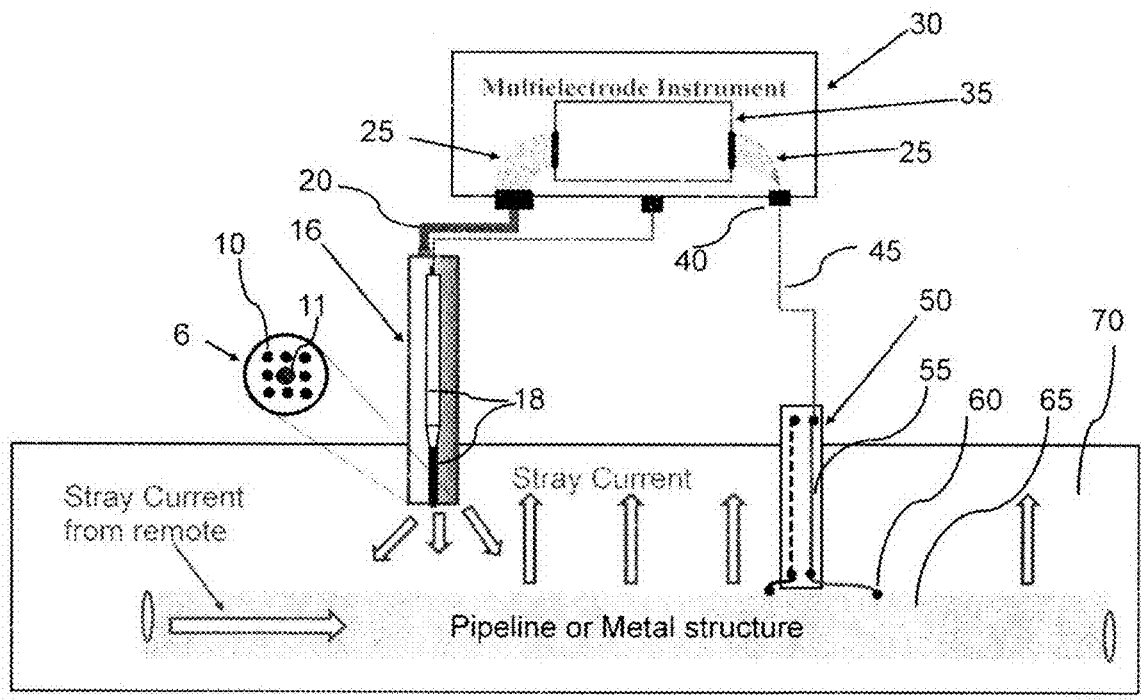
FIG. 2 illustrates a multielectrode probe with a built-in reference electrode for monitoring the pipe-to-soil potential and for monitoring corrosion of a buried pipe or other metal structure under the effect of stray currents.
Figure 3:
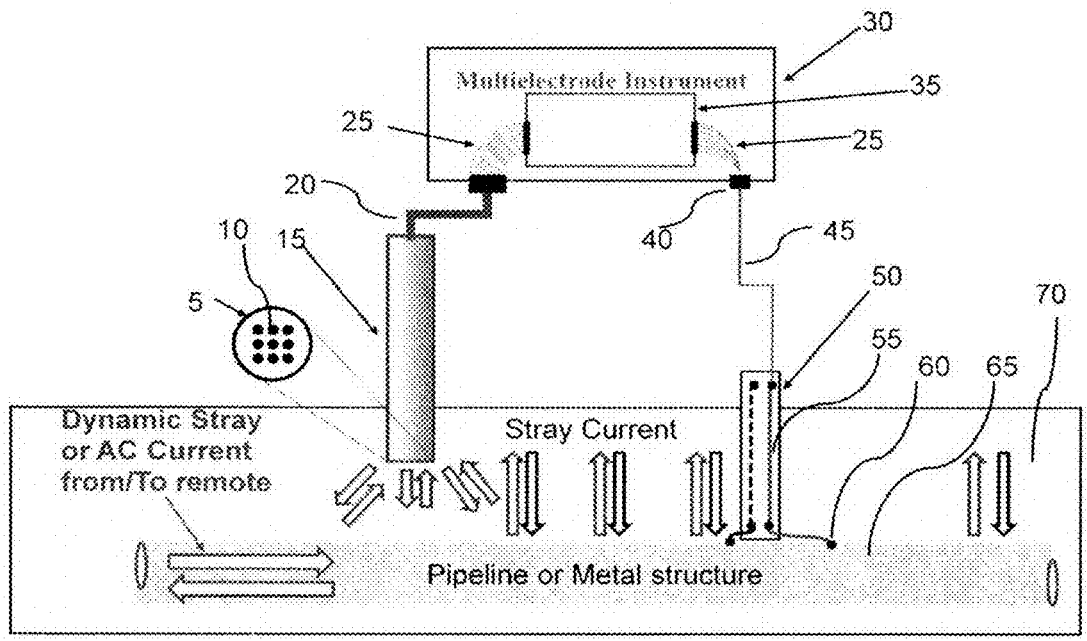
FIG. 3 illustrates the use of a multielectrode probe for monitoring corrosion of a buried pipe under the effect of AC current or dynamic stray currents that flow in and out at certain locations as a function of time.

FIGS. 1, 2, and 3

FIG. 1 shows how a multielectrode array sensor (CMAS) probe can be used to measure the corrosion rate of a metal that simulates the condition of buried pipe that has stray currents flowing in and out. In this configuration, all the electrodes (10) are at the same electrode potential of the buried pipe (65). If the stray currents flow into or out of the pipe surface (or the defect area if the pipe is coated), the currents will also flow into or out of the probe electrodes because the electrodes are connected to the pipe though the multielectrode instrument (30) and the other components (20, 25, 35, 40, 45, 55). Such currents are measured by the multi-channel ammeter (35). and converted to corrosion rate by the multielectrode instrument according to Faraday's Law. Compared with a coupon electrode probe which has only a single electrode, the multielectrode can measure the corrosion rate when the cathodic protection is insufficient, while the single-electrode probe cannot give the corrosion rate signal when there is not sufficient cathodic protection or when there is no stray currents. In addition, the multielectrode probe gives statistically more accurate corrosion rate that represents the worst case corrosion on the pipe because there are multiple electrodes, while the single-electrode probe only gives one corrosion signal. If this single electrode's behavior deviates from the statistical average corrosion behavior of the metal, the corrosion rate from the single-electrode probe does not represent the worst case corrosion.

FIG. 2 illustrates a multielectrode probe with a built-in reference electrode (18) for monitoring the pipe-to-soil potential and for monitoring the corrosion of a buried pipe or other metal structures at the same time under the effect of stray currents.

FIG. 3 shows the use of a multielectrode probe for monitoring corrosion of a buried pipe under the effect of AC current or dynamic stray currents that flow into or out of certain locations as a function of time. When the current flows out of the metal at a certain location, the probe would measure an electron flow from the probe electrodes to the pipe, indicating the accelerated corrosion caused by the stray current.

The multielectrode probes as shown in FIGS. 1, 2, and 3 should be designed such that it can be easy inserted into the soil or electrolyte (70). Because the spacing effect on the measurement of corrosion is not important in many applications, the individual electrodes do not have to be built into one probe or one assembly. The electrodes can be inserted into the soil or immersed in the electrolyte separately. In these cases, the multiple electrodes form an electrochemical multielectrode system.

FIG. 4

Figure 4:
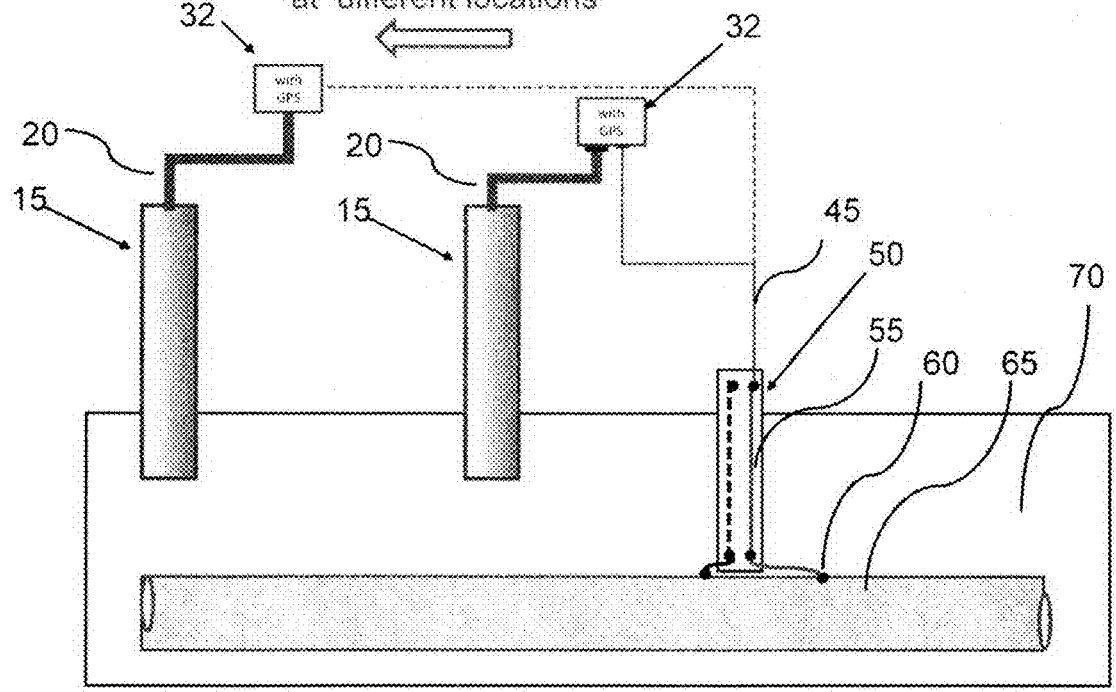
FIG. 4 illustrates the use of portable multielectrode probe for monitoring or surveying the corrosion of buried pipes at different locations.

Because the stray currents, AC sources, and the degree of cathodic protection vary with time and locations along a pipeline, it is important to measure the corrosion rate and the effect of stray current and CP at different locations. FIG. 4 illustrates how a portable multielectrode probe with or without a built-in reference electrode can be used to monitor or survey the effects at different locations along the pipeline. As the response of the sensor is fast (usually can be stabilized under one or a few minutes), the portable multielectrode probe and instrument may be carried by a person or a vehicle to perform the measurement at certain intervals (i.e., every 5 or 50 meters) to survey the effectiveness of cathodic protection in the field. The instrument (32) may also be equipped with a global positioning system (GPS) that automatically record the survey location. When the multielectrode probe with a built-in reference electrode is used, the pipe-to-soil potential can also be measured at the same time.

Compared to the close interval potential survey (CIPS or CIS) technique that measures the pipe-to-soil potential which is used to correlate the corrosion of the pipe, the present invention directly measures the corrosion rate which is the ultimate information a surveyor wants to know. In addition, the present invention does not require the switching on and of the cathodic protection source, while the CIPS method requires the on-and-off switching to measure the on-potential and the off-potential.

FIG. 5

Figure 5:
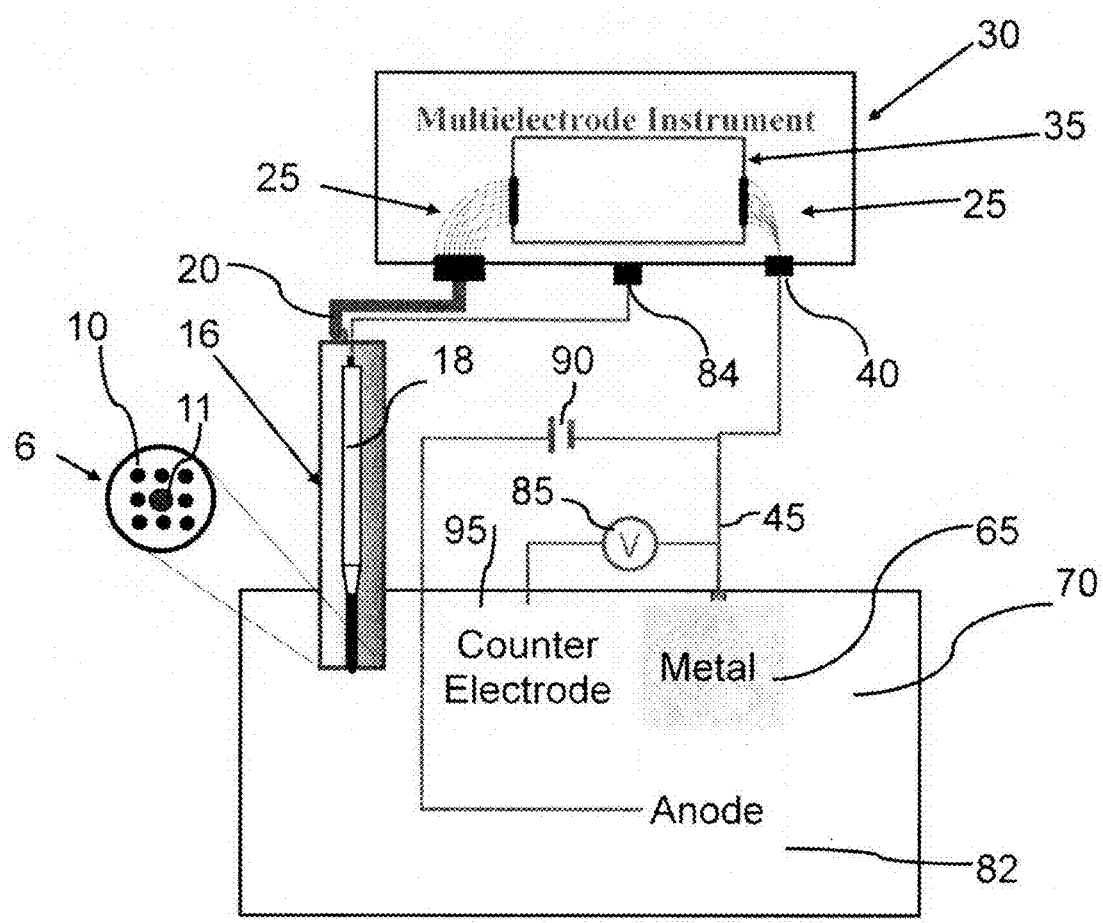
FIG. 5 illustrates the experimental setup for proof-of-concept experiment with the multielectrode probe with built-in reference electrode.

FIG. 5 illustrates how the new multielectrode probe that has a built-in reference electrode was used for the proof-of-concept experiment to obtain the results as discussed in the following section.

FIGS. 6, 7, 8, and 9

FIGS. 6, 7, 8, 9 shows the test results, proving that the invention works for intended purposes. They are discussed in detail in the below Example Test Results section.

EXAMPLE TEST RESULTS

The setup of FIG. 5 was used in the test. The electrodes (10) were made of Type 1018 carbon steel wire (1 mm diameter) and the exposed surface area for each electrode was the cross section (0.78 mm$^2$). The metal (65) was made of a coil of the same carbon steel wire (1 mm diameter and 80 cm length). The anode (82) and counter electrode (95) were made of Alloy 276 tubing. The electrolyte was 0.5 M NaCl solution. The cathodic protection power source (90) was a DC power supply. The interfering AC source was a function generator that supplies a cyclic triangle wave at about 0.01 Hz frequency. The reference electrode (18) was a standard Ag/AgCl electrode (SSC) filled with saturated KCl.

Figure 6:
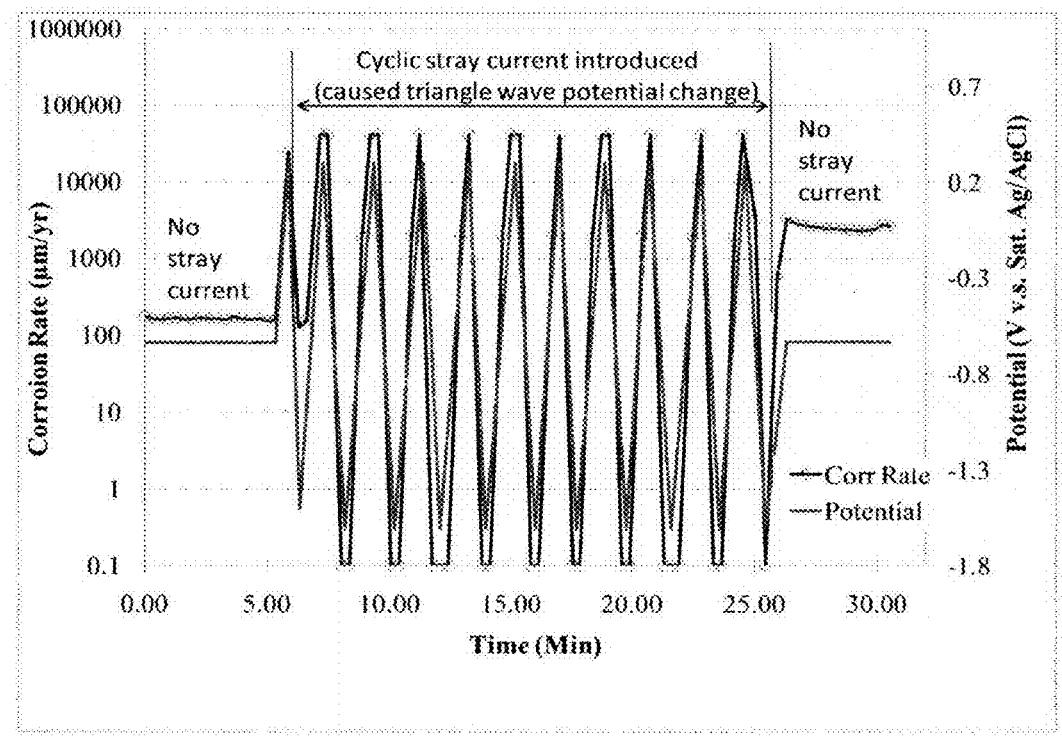
FIG. 6 illustrates the corrosion rate for carbon steel metal obtained with and without the effect of triangle wave dynamic stray currents.

FIG. 6 illustrates the corrosion rate for carbon steel metal obtained with and without the effect of the triangle-wave dynamic stray currents. The corrosion rate from the probe was about 200 to 3000 um/yr before and after the application of the stray current. When the stray-current was introduced, the potential of the metal fluctuated between −1.6 V and 0.3 V (v.s. SSC). When the potential was near 0.3V, the corrosion rate was about 50 mm/yr and when the potential decreased to below −0.7 V, the corrosion rate dropped to 0.01 um/yr which is the lower detection limit of the multielectrode instrument. The rate of 0.01 um/yr is extremely low and can be considered zero.

Figure 7:
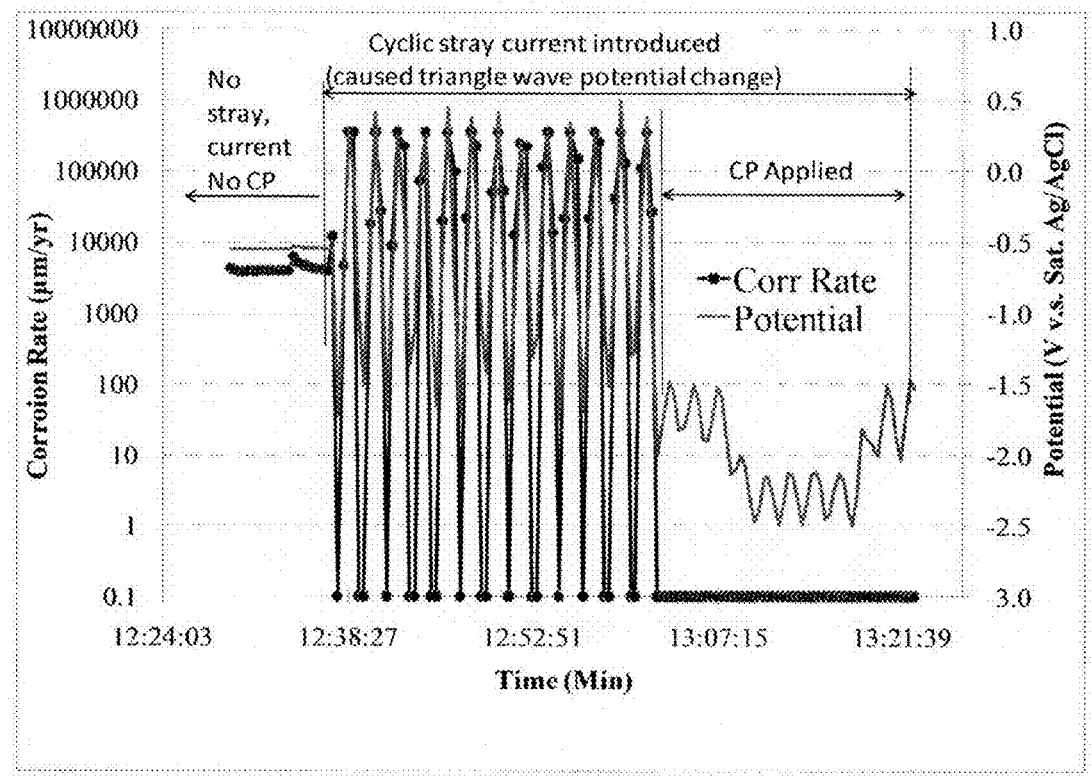
FIG. 7 illustrates the corrosion rate for carbon steel metal obtained under the effects of triangle wave dynamic stray currents and cathodic protection.

FIG. 7 illustrates the corrosion rate for carbon steel metal obtained under the effects of triangle-wave dynamic stray currents and cathodic protection (CP). When enough CP was applied such that the potential of the metal was never above −1.0 V, the corrosion rate remained at 0.01 um/yr, which indicates the effectiveness of the CP. It should be mentioned that the sampling rate of the multielectrode instrument was designed for DC measurements and could not be increased to values higher than 0.05 Hz. Higher sampling rate may catch even higher corrosion rate near the peak of the potential, but the results in FIG. 7 is sufficient to demonstrate the usefulness of the multielectrode measurement for the effect of stray current.

Figure 8:
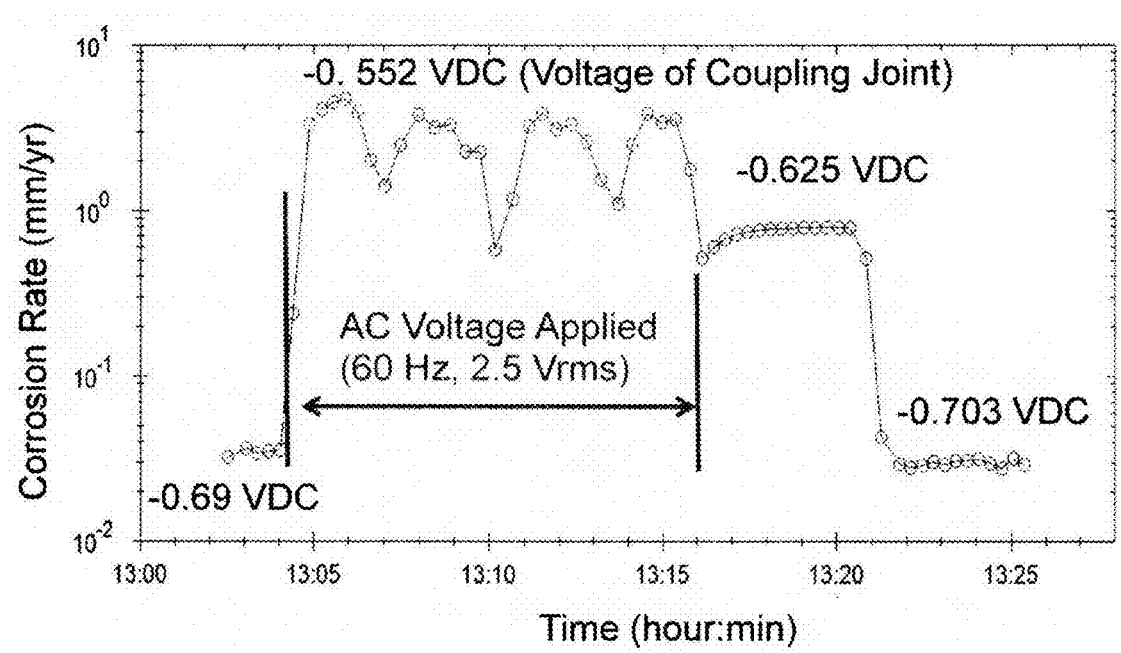
FIG. 8 illustrates the corrosion rate for carbon steel obtained under the interference of alternating current (AC) and the effectiveness of cathodic protection.

FIG. 8 illustrates the corrosion rate for carbon steel obtained under the interference of AC and the effectiveness of CP. The AC source was 60 Hz frequency and 2.5 V RMS (root mean square). The corrosion rate fluctuated between 0.5 and 5 mm/yr. The result also shows that the corrosion rate was relatively lower when the metal potential that was adjusted by the DC power was lower.

Figure 9:
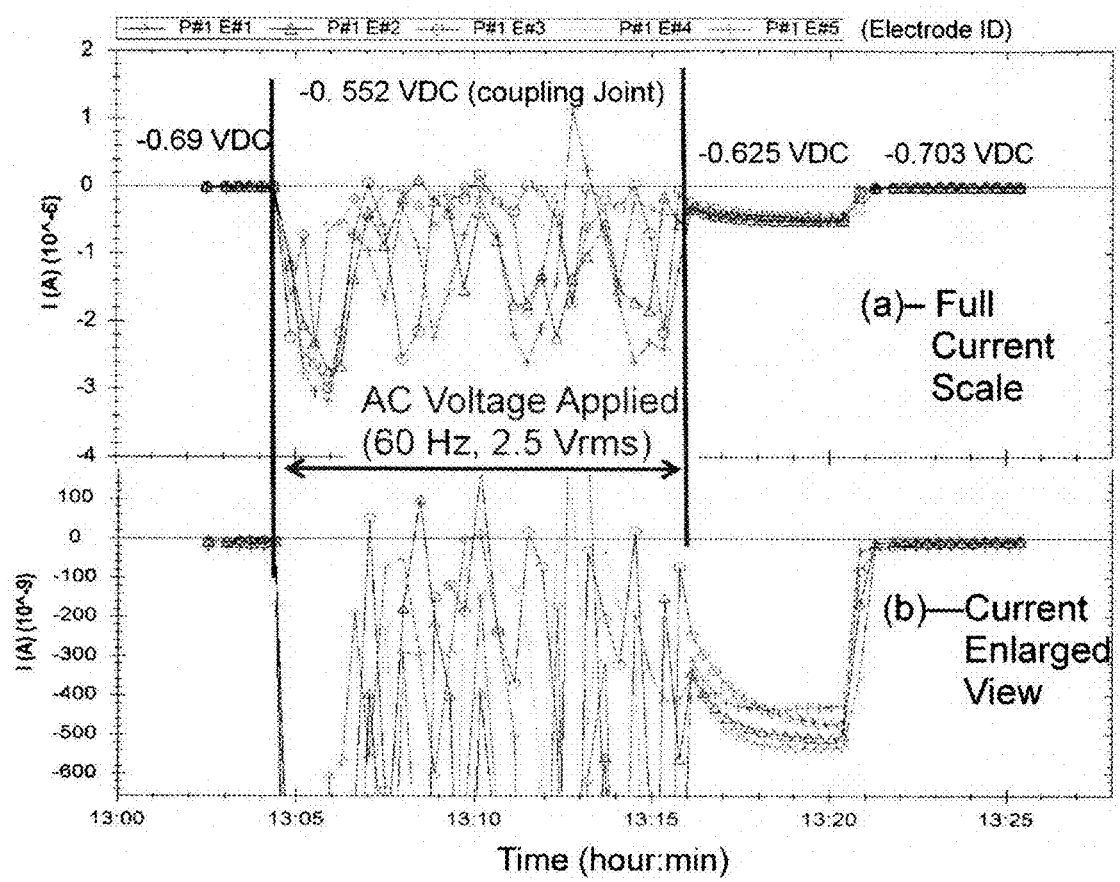
FIG. 9 illustrates the responses of the currents from individual electrodes of the multielectrode probe to the AC interference and the cathodic protection.

FIG. 9 illustrates the responses of the currents from individual electrodes of the multielectrode probe to the AC interference and the CP. It clearly shows that the individual currents were relatively stable without the AC interference, but jumping around wildly when the AC voltage was applied. This figure clearly shows that the multielectrode probe can be used to detect the presence of AC interference.
Other Embodiments The techniques described are mainly for use in monitoring the corrosion of pipes buried in soil and metal structures immersed in electrolyte solutions. The method may also be used in other systems and environments that may cause the potential of the metal to change dynamically.

Although the present invention has been described in detail, it should be understood that various changes, substitutions, and alterations can be made hereto, without departing from the spirit and scope of the invention as defined by the appended claims.

CONCLUSIONS, RAMIFICATIONS, AND SCOPE

Accordingly, the method disclosed in this invention is a more effective way to monitor the effect on the corrosion of a buried or immersed metal structure caused by stray currents and AC interference. Compared with currently used coupon electrode probe which has only a single electrode connected to the metal structure, the multielectrode probe in the present invention can measure the corrosion rate when there is no or insufficient cathodic protection, while the single-electrode probe cannot give the corrosion rate signal when there is not sufficient cathodic protection. In addition, the multielectrode probe gives statistically more accurate corrosion rate that represents the worst-case corrosion on the pipe or metal structure because there are multiple electrodes. If the single electrode's behavior deviates from the statistical average corrosion behavior of the metal, the corrosion signal from the single-electrode probe does not represent the worst-case corrosion.

The invention claimed is:

1. A multielectrode system for monitoring corrosion of a metal structure in an electrolyte environment that causes stray current or alternating current to flow into or out of the metal structure, comprising:
   (a) at least three electrodes that are made of a metal that has the same corrosion resistance to the metal structure and certain surface area of each of these electrodes is exposed to the electrolyte environment and each of these electrodes is electrically connected to the metal structure by wires;
   (b) an ammeter electrically connected between each electrode of these electrodes and the metal structure for reading the current that can be correlated to the corrosion of the electrode and the corrosion of the metal structure.

2. The multielectrode system of claim 1, wherein the number of said electrodes is five or more.

3. The multielectrode system of claim 1 wherein the electrodes are embedded in an electrically insulating material to form a one-piece probe and the insulating material allows a small surface area of each electrode to be exposed to the electrolyte environment.

4. The multielectrode system of claim 3, wherein the number of said electrode is five or more.

5. The multielectrode system of claim 3, wherein a reference electrode is added to form a combination multielectrode probe for measuring corrosion and potential at the same time.

6. A multielectrode probe for monitoring corrosion of a metal structure in an electrolyte environment, comprising:
   (a) at least three electrodes that are made of a metal that has the same corrosion resistance to the metal structure and each of these electrodes is electrically connected to the metal structure by wires;
   (b) an ammeter electrically connected between each electrode of these electrodes and the metal structure for reading the current that can be correlated to the corrosion of the electrode and the corrosion of the metal structure;
   (c) a reference electrode that is built into the multielectrode probe and is used to measure the potential of the buried or immersed metal structure;
   wherein the electrodes are embedded in an electrically insulating material to form a one-piece probe and the insulating material allows a small surface area of each of the electrodes to be exposed to the electrolyte environment.

7. The multielectrode probe of claim 6, wherein the number of said electrodes is five or more.

8. A method to use a multielectrode system to measure corrosion of a metal structure in an electrolyte environment that causes dynamic stray current or alternating current to flow into or out of the metal structure, comprising:

(a) at least three electrodes that are made of a metal that has the same corrosion resistance to the metal structure and certain surface area of each of these electrodes is exposed to the electrolyte environment and each of these electrodes is electrically connected to the metal structure by wires;

(b) an ammeter electrically connected between each electrode of these electrodes and the metal structure for reading the current that can be correlated to the corrosion of the electrode and the corrosion of the metal structure.

9. The method of claim 8, wherein the currents from all electrodes are analyzed and only the statistically significant high currents are used to correlate the corrosion of the metal structure.

10. The method of claim 8, wherein the electrodes are embedded in an electrically insulating material to form a one-piece probe and the insulating material allows a small surface area of each electrode to be exposed to the electrolyte environment.

11. The method of claim 10, wherein the probe is portable and can be carried by a person or a vehicle to survey the corrosion of a buried pipe or metal structure at different locations along the metal structure.

12. The method of claim 11, wherein a global positioning system is added to the ammeter for automatically recording the survey locations along the metal structure.

13. The method of claim 10, wherein the probe has a built-in reference electrode for surveying the corrosion of a buried metal structure and surveying the structure-to-electrolyte potential at the same time.

* * * * *